(12) United States Patent
Wajs (10) Patent No.: US 8,090,104 B2
(45) Date of Patent: Jan. 3, 2012

(54) METHOD OF DESCRAMBLING A SCRAMBLED CONTENT DATA OBJECT

(75) Inventor: Andrew Augustine Wajs, Haarlem (NL)

(73) Assignee: Irdeto Access B.V., Hoofddorp (NL)

( * ) Notice: Subject to any disclaimer, the term of this patent is extended or adjusted under 35 U.S.C. 154(b) by 1347 days.

(21) Appl. No.: 11/644,171

(22) Filed: Dec. 22, 2006

(65) Prior Publication Data

US 2007/0177733 A1    Aug. 2, 2007

(30) Foreign Application Priority Data

Jan. 3, 2006    (EP) .................................... 06100043

(51) Int. Cl.
    *H04N 7/167*    (2011.01)
(52) U.S. Cl. ........ 380/239; 380/240; 380/241; 380/259; 380/277; 713/150; 713/165; 713/168; 713/169; 713/170
(58) Field of Classification Search .................. 713/168, 713/169, 170, 150, 165; 380/239, 259, 277, 380/240, 241
    See application file for complete search history.

(56) References Cited

U.S. PATENT DOCUMENTS

| | | | |
|---|---|---|---|
| 6,510,519 B2 * | 1/2003 | Wasilewski et al. | 713/168 |
| 6,697,489 B1 * | 2/2004 | Candelore | 380/200 |
| 7,487,349 B2 * | 2/2009 | Ksontini et al. | 713/163 |
| 2002/0001386 A1 | 1/2002 | Akiyama | |
| 2004/0017918 A1 | 1/2004 | Nicolas | |
| 2004/0141614 A1 * | 7/2004 | Choi et al. | 380/200 |
| 2005/0021985 A1 | 1/2005 | Ono et al. | |

FOREIGN PATENT DOCUMENTS

| | | | |
|---|---|---|---|
| WO | WO 97/38530 | * | 3/1997 |
| WO | WO-9738530 A1 | | 10/1997 |

OTHER PUBLICATIONS

"Search Report for European Application No. 06100043.6-2223", (Jun. 27, 2006).
Translation to English of: "Russian Application No. 2006147370, Office Action issued Nov. 13, 2010", 6 pgs.

* cited by examiner

*Primary Examiner* — Vivek Srivastava
*Assistant Examiner* — Hee Song
(74) *Attorney, Agent, or Firm* — Schwegman, Lundberg & Woessner, P.A.

(57) ABSTRACT

In a method of descrambling a scrambled content data object, at least a section of the scrambled content data object is descrambled by applying at least one decryption operation under a key at least partly derivable from a content descrambling key. At least one content descrambling key is obtained from a message received from a conditional access sub-system over a data communication channel. At least one cryptogram of data obtainable from at least one content descrambling key in the message, each of which cryptograms are carried in the message, is decrypted under an associated channel key. A first key is used to establish each channel key. At least the section of the scrambled content data object is descrambled by applying a further decryption operation under a key at least partly derivable from the first key.

22 Claims, 5 Drawing Sheets

METHOD OF DESCRAMBLING A SCRAMBLED CONTENT DATA OBJECT

CLAIM OF PRIORITY

The present patent application claims the priority benefit of the filing date of European Application (EPO) No. 06100043.6 filed Jan. 3, 2006, the entire content of which is incorporated herein by reference.

FIELD

Respective examples of such methods, devices and such a system are known from WO 97/38530. That publication describes a decoder for a pay TV system, wherein digital information signals are scrambled using a control word in accordance with the Eurocrypt standard. The decoder comprises a conditional access module (CAM) and a smart card. The CAM is provided with a descrambler unit. During operation, the CAM transfers entitlement control messages towards a microprocessor of the smart card so that the microprocessor can process the entitlement control message and extract the control word. Thereafter the smart card returns the decrypted control word towards the CAM so that the descrambler is allowed to descramble a digital data stream received from a demodulator. To provide secure communication between the CAM and the smart card, the CAM generates a random key Ci and transfers the key to the smart card in a first message encrypted using a public key of the smart card. The random key Ci is used to encrypt and decrypt transmissions between the devices.

A problem of the known system is that it is possible to substitute another device for the smart card, to establish a communication session with the descrambler of the CAM, and then to supply illicitly obtained control words to the descrambler. The descrambler is designed to work with any conditional access system, so that it is possible for a hacker to simulate a conditional access system to provide the descrambler with control words from a source not controlled by the provider of the content data stream.

BRIEF DESCRIPTION OF THE DRAWINGS

The invention will now be explained in further detail with reference to the accompanying drawings, in which FIG. 1 gives a schematic overview of a system for scrambling, transmitting and descrambling content data streams.

DETAILED DESCRIPTION

The invention generally relates to methods of descrambling a scrambled content data object, and structures for performing such methods wherein at least a section of the scrambled content data object is descrambled by applying at least one decryption operation under a key at least partly derivable from a content descrambling key, wherein at least one content descrambling key is obtained from a message received from a conditional access sub-system over a data communication channel, wherein at least one cryptogram of data obtainable from at least one content descrambling key in the message, each of which cryptograms are carried in the message, is decrypted under an associated channel key, and wherein a first key is used to establish each channel key.

The invention also relates to a device for descrambling a scrambled content data object, including an input for receiving the scrambled content data object and an input for receiving messages from a conditional access sub-system over a data communication channel.

The invention also relates to a method of providing conditional access to a content data object, including providing at least one content scrambling key to a scrambler, arranged to scramble at least a section of the content data object by applying at least one encryption operation under a key at least partly derivable from the content scrambling key, providing an entitlement message to at least one conditional access sub-system for providing a message over a data communication channel to a descrambler of an authorised receiver, which message includes data enabling the descrambler to obtain at least one content descrambling key and which message to the descrambler carries at least one cryptogram, the conditional access sub-system being configured to generate the cryptogram by encrypting under a channel key data obtainable from at least one content descrambling key in the message, wherein the conditional access sub-system is configured to use a second key to establish the channel key.

The invention also relates to a system for providing conditional access to a content data object, including a scrambler, arranged to scramble at least a section of the content data object by applying at least one encryption operation under a key at least partly derivable from a content scrambling key, and at least one conditional access sub-system for providing a message over a data communication channel to a descrambler of an authorised receiver, which message includes data enabling the descrambler to obtain at least one content descrambling key and which message carries at least one cryptogram, wherein the conditional access sub-system is configured to generate the cryptogram by encrypting under a channel key data obtainable from at least one content descrambling key in the message to the descrambler, and wherein the conditional access sub-system is configured to use a second key to establish the channel key.

The invention also relates to a device for scrambling a content data object.

The invention also relates to a computer program.

It is an aspect of the invention to provide methods, devices, a system and a computer program of the types defined above that enable a provider of conditional access to a content data object to enforce the use of a particular conditional access sub-system.

This aspect may be achieved by the method of descrambling a scrambled content data object according to the invention, which is characterised in that at least the section of the scrambled content data object is descrambled by applying a decryption operation under a key at least partly derivable from the first key.

Because at least the section of the content data object is descrambled by applying a decryption operation under a key at least partly derivable from a content descrambling key, the involvement of a conditional access sub-system is required.

The conditional access sub-system, in turn, must possess information for deriving the first key or a key forming a key pair with the first key, in order to be able to form the cryptograms for the messages from which the content descrambling key or keys are obtainable. This is also true of the provider of the scrambled content data object, due to the fact that it is descrambled by applying a decryption operation under a key at least partly derivable from the first key. This common requirement ties the conditional access sub-system to the provider of the scrambled content data object, preventing the use of a different source of massages carrying content descrambling keys. An added advantage is that variation in the scrambling of the content data object is achievable by the use of both a content descrambling key and a first key. The first key need not, therefore vary so rapidly as the content descrambling key in order to achieve sufficient variation in the key information used to scramble the content data object. This is advantageous if the conditional access sub-system cannot be provided frequently with key information for forming the cryptograms. On the other hand, with each change of required content descrambling key, another message exchange with the conditional access sub-system is required. Each exchange functions also as a check on the continuing presence of the right conditional access sub-system.

It is observed that the first key, or a key forming a key pair with it, could correspond to the channel key, depending on the implementation of the method. The, or one of the, cryptograms may be a signature, based on enough of the contents of the message to the descrambler to tie the signature to the message contents. Although the term conditional access sub-system is derived from implementations in which the scrambled content data object is a content data stream, it is to be understood also as comprising what is conventionally called a Digital Rights Management agent.

In an embodiment, wherein the first key is a public key of an asymmetric key pair, a cryptographic operation including an asymmetric cipher under the first key is applied on data exchanged with the conditional access sub-system.

This embodiment makes the use of a particular descrambler by several providers of conditional access sub-systems feasible, since it is easier to distribute correspondingly many different first keys. The first keys need not be kept secret. It is not possible to impersonate a conditional access sub-system, since that requires possession of the corresponding secret key to enable the descrambler to establish the correct channel key.

In an embodiment, at least the section of the scrambled content data object is descrambled by applying a decryption operation under a key based on both the first key and the content descrambling key.

Thus, the section is descrambled by applying a single function with a single key derived from at least both the first key and a content descrambling key. This is an efficient way of ensuring that the tie between the scrambled content data object and the conditional access sub-system cannot easily be circumvented by applying a decryption under the first key to a section of the scrambled content data object prior to supplying it to the descrambler for decryption under a key derived from the content descrambling key and/or by applying a decryption under the first key to the data obtained as output from such a descrambler.

In an embodiment, at least the section of the scrambled content data object is descrambled by at least applying a first decryption operation on the section of the scrambled content data object under a key at least partly derivable from a content descrambling key and applying a further decryption operation under a key at least derivable from the first key to the output of the first decryption operation.

Thus, even if the first key is not secret, the tie between the scrambled content data object and a particular conditional access sub-system cannot be circumvented by first decrypting the scrambled content data object under the first key and then providing it to the descrambler.

In an embodiment, at least the section of the scrambled content data object is descrambled by at least applying a second decryption operation under a key at least partly derivable from a content descrambling key to data obtained as output of a further decryption operation under a key at least derivable from the first key.

Thus, even if the first key is not secret, the tie between the scrambled content data object and a particular conditional access sub-system cannot be circumvented by decrypting the output of the descrambler under the first key and then providing it to a receiver. In this embodiment, it is the descrambler that must perform at least both operations, i.e. descrambling under a key at least partly derivable from a content descrambling key and at least one further decryption under a key at least derivable from the first key.

A variant includes deriving at least two keys from a single content descrambling key, wherein a first of the derived keys is used in the first decryption operation and a second of the derived keys is used in the second decryption operation.

This is an efficient manner of preventing a hacker from circumventing the tie between the scrambled content data object and the conditional access sub-system by applying a decryption under the first key to the scrambled content data object prior to supplying it to the descrambler for decryption under a key derived from the content descrambling key and/or by applying a decryption under the first key to the data obtained from such a descrambler.

An embodiment includes applying a decryption operation involving a symmetric key cipher under a key obtained as a function of at least the first key.

This embodiment has the effect of allowing the use of a public key as the first key, whilst still obtaining the improved processing speed associated with symmetric key ciphers.

An embodiment includes generating a channel key, encrypting the generated channel key under the first key and communicating the encrypted channel key to the conditional access sub-system, and decrypting at least part of the message received from the conditional access sub-system under the channel key, preferably using a symmetric cipher.

This embodiment has the effect of allowing longer use of the first key without affording better opportunities for cryptanalysis. Especially where the first key is an asymmetric key, the randomness of the cryptograms is improved by avoiding its direct use. Another effect is that it is possible to change channel keys without the immediate co-operation of the provider of the scrambled content data object, since the key forming a key pair with the first key and used in an encryption operation that is part of the scrambling need not be changed.

In an embodiment, a new channel key is established upon receipt of a new version of the first key.

Thus, receipt of a new version of the first key triggers a renewed check that the conditional access sub-system is associated with the provider of the scrambled content data object.

An embodiment includes obtaining a digital signature from the message received from the conditional access sub-system,
    using at least the first key to verify the digital signature, and
    descrambling at least the section of the scrambled content data object in dependence on the result of the verification.

This embodiment has the effect that the descrambler verifies the identity of the conditional access sub-system by means of a signature.

A variant includes generating a channel key, preferably as a random number, encrypting the generated channel key under the first key and communicating the encrypted channel key to the conditional access sub-system, and further using the channel key to verify the digital signature.

This variant has the advantage that the first key is not used directly to form the signature. Thus, it is less easily compromised. Moreover, verification of the signature can be accomplished faster than a complete decryption of the message from the conditional access sub-system.

According to another aspect of the invention, there is provided a device for descrambling a scrambled content data object, including an input for receiving the scrambled content data object and an input for receiving messages from a conditional access sub-system over a data communication channel, wherein the device is configured to execute a method of descrambling a scrambled content data object according to the invention.

The device may be implemented as a monolithic device for incorporation into receivers. It has an in-built check of the association between the provider of the scrambled content data and the conditional access sub-system.

According to another aspect, the method of providing conditional access to a content data object according to the invention is characterised by providing the conditional access sub-systems with key information representative of the second key and providing to the scrambler key information representative of a first key forming a key pair with the second key, wherein the scrambler is arranged to scramble at least the section of the content data object by applying an encryption operation under a key at least partly derivable from the first key.

Thus, the conditional access sub-systems are tied to the scrambled content data object. Only the conditional access sub-systems provided with the key information representative of the second key are able to provide the message to the descrambler of an authorised receiver that includes data enabling the descrambler to obtain at least one content descrambling key. The descrambler is forced to check that the conditional access sub-system has the key information, because it uses data representative of a first key forming a key pair with the second key in order to descramble both the content data object and to establish the channel key.

In an embodiment, wherein the second key is a secret key of an asymmetric key pair, a first key corresponding to a public key of the asymmetric key pair is provided to a transmitter arranged to communicate the first key in a message to the authorised receiver.

Because the first key is public, distribution thereof is relatively simple. This makes it possible for several providers of scrambled content data objects to use the same descrambler with different respective conditional access sub-systems. The second key is secret, but is provided only to the conditional access sub-systems associated with a particular provider.

In an embodiment, wherein the content data object comprises a content data stream, a sequence of control words is provided to the scrambler, the scrambler being arranged to use a current one of the sequence of control words as the content scrambling key, and the method further includes transmitting the first key in an Entitlement Control Message further including at least one of the sequence of control words.

This has the effect that changes in control word and first key can be synchronised relatively easily.

An embodiment includes providing at least one portable secure device comprising a processing unit, memory, an interface to a descrambler of an authorised receiver and at least one of the conditional access sub-systems.

The portable secure device that is the direct inevitable result of applying this embodiment can be associated with a particular provider of scrambled content data objects, yet interface with a descrambler of an authorised receiver that is potentially suitable for use in descrambling content data objects from several different providers. Such a descrambler co-operates with the portable secure device in such a manner that it can check the latter's association with the provider of the scrambled content data object to be descrambled.

According to another aspect, the system for providing conditional access to a content data object is characterised in that the scrambler is arranged to scramble at least the section of the content data object by applying an encryption operation under a key at least partly derivable from a first key forming a key pair with the second key.

Thus, the scrambler and conditional access sub-systems are each able to obtain the second key. The descrambler can check that this is the case by decrypting the cryptogram and by descrambling the scrambled content data object.

In an embodiment, wherein the second key is a secret key of an asymmetric key pair, the system is configured to provide a first key corresponding to a public key of the asymmetric key pair to a transmitter arranged to communicate the first key in a message to the authorised receiver.

This has the effect that the descrambler of an authorised receiver can be enabled to check the association between any conditional access sub-system and a scrambled content data object without having to be pre-programmed with the necessary key information. The first key being a public key, there is no need to keep it secret when enabling the descrambler to perform the check in this way.

In an embodiment, configured for scrambling a content data object comprising a content data stream, the system is arranged to effect a change in value of the second key, wherein the system further comprises a system for synchronising a change in supply of the second key to a new value with a transition from use of a current one to use of a next one of a sequence of control words as content scrambling key.

Thus, it is possible to change the second key without having to indicate all possible combinations of the current, next control word and key forming a key pair with the second key at the applicable point in the scrambled content data stream to the descrambler of an authorised receiver.

In an embodiment, the scrambler is configured to scramble at least the section of the content data object by at least applying a first encryption operation on the section of the content data object under a key at least partly derivable from a content scrambling key and applying a further encryption operation under a key at least partly derivable from a first key forming a key pair with the second key to the output of the first encryption operation.

This means that a hacker cannot circumvent a check on the association between the conditional access sub-system and the scrambled content data object by decrypting the output of the descrambler under the key forming a key pair with the second key, even if that key is available to him.

In an embodiment, the scrambler is configured to scramble at least the section of the content data object by at least applying a second encryption operation under a key at least partly derivable from a content scrambling key to data obtained as output of a further encryption operation under a key at least partly derivable from a first key forming a key pair with the second key.

The effect is that a hacker cannot circumvent a check on the association between the conditional access sub-system and the scrambled content data by decrypting the scrambled content data under the key forming a key pair with the second key, prior to passing it to the descrambler, even if that key is available to him.

A variant is configured to derive at least two keys from a single scrambling key, and to use a first of the derived keys in the first encryption operation and a second of the derived keys in the second encryption operation.

This is an efficient implementation of a system enforcing the use of a descrambler that checks the association between a conditional access sub-system and the provider of the scrambled content data object, even where the key forming a key pair with the second key is not kept secret.

In an embodiment, the encryption operation under a key at least partly derivable from the first key involves a symmetric key cipher under a key obtained as a function of at least the first key.

This embodiment has the advantage of efficiency and increased randomness. Symmetric keys can be made more random than asymmetric keys.

According to another aspect of the invention, there is provided a device for scrambling a content data object, presenting all the features of the scrambler in the system for providing conditional access disclosed above and being thus constructed and evidently intended for use in the system for providing conditional access according to the invention.

According to another aspect of the invention, there is provided a computer program, including a set of instructions capable, when incorporated in a machine-readable medium, of causing a system having information processing capabilities to perform a method according to the invention and/or to function as a scrambler or conditional access sub-system in a system according to the invention.

Figure 1:
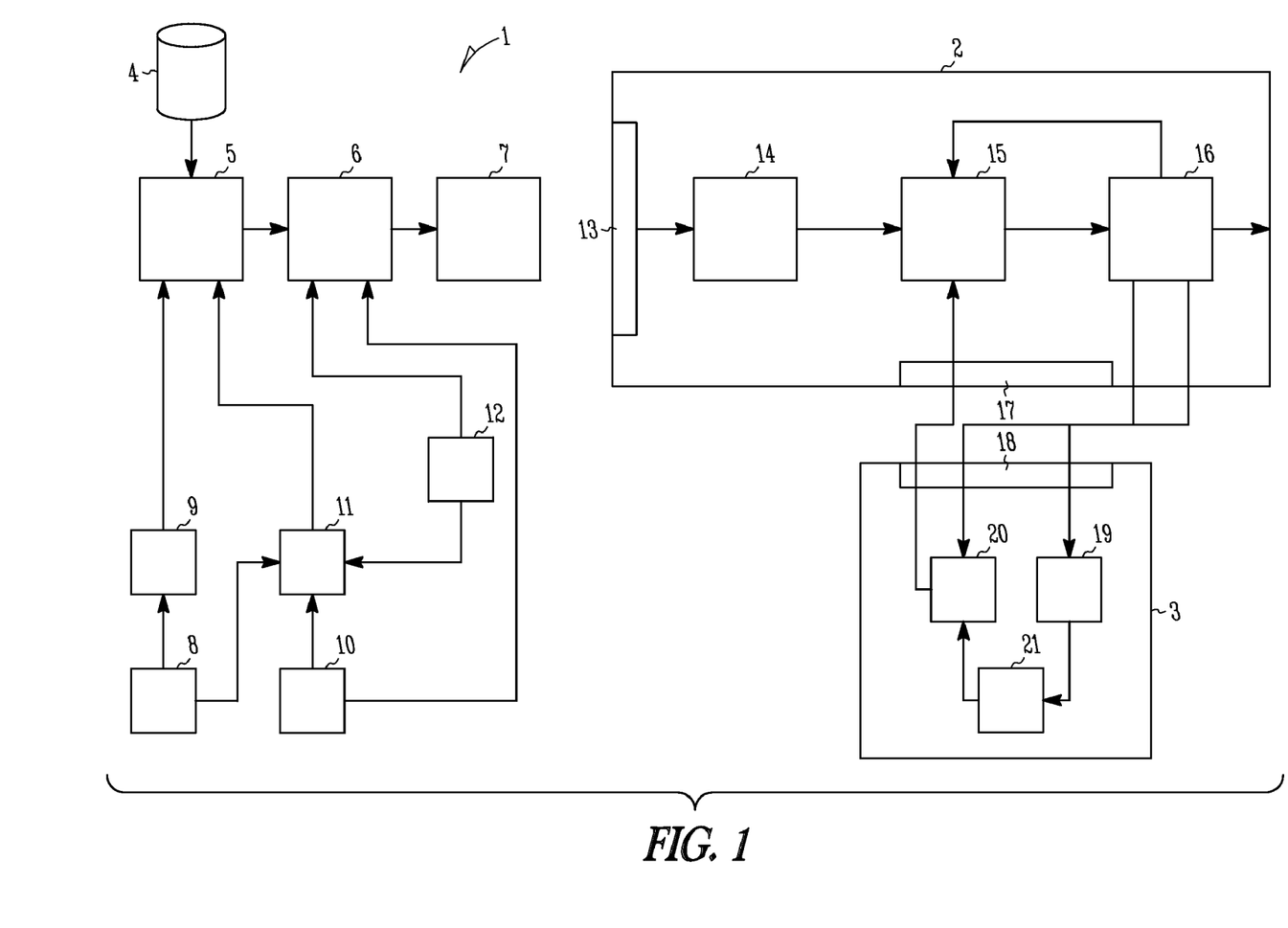

In an example, illustrated in FIG. 1, conditional access is provided to content data broadcast from a head-end system 1 to an authorised receiver 2. The receiver 2 interfaces with a conditional access sub-system 3, implemented as a detachable secure device. The content data is broadcast via a terrestrial, cable or satellite broadcast network or a chain of such networks. The example wherein scrambled content data is broadcast is used throughout this description. However, the methods outlined herein may also be used to provide conditional access to content disseminated on data carriers such as Digital Versatile Disks (DVDs), Compact Disks (CDs), or magnetic recording media. In addition, the methods find application in providing conditional access to content distributed over computer networks, such as the Internet, be it in a unicast, multicast or broadcast mode. This includes content data objects not comprising a stream of content data, such as digital documents. In an alternative implementation to the one described herein in detail, the conditional access sub-system may be a secure software module executed by a processor in the receiver 2. Such secure software may, for example, be protected by the use of code obfuscation techniques, etc.

One or more streams of content data are obtained from data storage 4, and multiplexed by a multiplexer 5 into a single stream. In the illustrated example, the entire multiplex of elementary streams is scrambled by a scrambler 6 and broadcast by a transmitter 7. It is noted that one or more selected elementary streams may be individually scrambled in another embodiment, rather than the entire multiplex.

A subscriber authorization system (SAS) 8 is responsible for authorising and billing individual subscribers. It provides authorisation data—including a key at a high level in a key hierarchy—to an Entitlement Management Message (EMM) generator 9 in a manner known as such. A control word (CW) generator 10 continually generates the next of a sequence of control words (CWs), varying from one to the next. The control words are encrypted under a key, for example the key provided by the SAS 8, to form Entitlement Control Messages (ECMs). The ECMs are generated by an ECM generator 11. The control words are also provided to the scrambler 6, which uses them in a manner to be described in further detail below to scramble the content data stream received from the multiplexer 5. As described thus far, the head-end system 1 corresponds to those known, for example, from "Digital Video Broadcasting (DVB); Implementation Guidelines of the DVB Simulcrypt Standard", ETSI Technical Report 102 035, European Telecommunications Standards Institute.

The illustrated head-end system 1 further comprises a public/private key pair generator 12. In the illustrated embodiment, a first key of the public/private key pair, namely the public key, is provided to the ECM generator 11. The ECM generator 11 includes it in purposively provided key messages to the receiver 2. In another embodiment (not illustrated), each first key is provided to authorised receivers in an ECM.

First keys may be distributed to the receiver 2 via a different route than the scrambled content data stream, for example over a computer network, on a data carrier, as a factory setting, etc. In the example, it will be assumed that the first keys are provided in key messages in a separate elementary stream within the multiplex comprising the scrambled content data stream.

The second key of the public/private key pair, the secret key, is provided to the conditional access sub-system 3. In the illustrated embodiment, it will be assumed that the second key is provided in an encrypted message, encrypted under a key accessible only to the device comprising the conditional access sub-system 3. In an alternative embodiment, the second key may be static, or derived in a pre-determined manner from a static key stored in the device comprising the conditional access sub-system 3 prior to the distribution thereof to authorised subscribers.

The receiver 2 is illustrated only insofar as considered necessary for explaining the invention. It is illustrative for a range of devices including gateways to a home network, personal computers provided with additional functionality, set-top boxes, digital television sets, etc. It comprises a receiver interface 13 for receiving a broadcast signal through the broadcast network. It further comprises a tuner/demodulator 14 for obtaining the scrambled content data stream from the broadcast signal. A descrambler 15 is illustrated schematically in FIG. 1 and in detail in FIG. 2. The descrambler 15 descrambles the scrambled content data stream. The clear content data stream is provided to a demultiplexer 16, which provides selected elementary streams forming a program to an output of the receiver 2, so that the program may be rendered. Although FIG. 1 shows functional units rather than actual hardware components, the descrambler 15 will generally correspond to a discrete device, an application specific integrated circuit, or conceivably a programmed digital signal processor or field programmable gate array.

The receiver 2 includes an interface 17 to the conditional access sub-system 3. The interface 17 is of a standardised type to render the receiver 2, and in particular the descrambler 15 interoperable with any of a plurality of different conditional access sub-systems, each associated with a different conditional access provider. The conditional access sub-system 3 includes a corresponding interface 18. The conditional access sub-system 3 receives the ECMs and EMMs from the demultiplexer 16 through the interfaces 17,18. In the illustrated embodiment, it also receives any messages carrying a new second, secret key, as generated by the public/private key pair generator 12.

The conditional access sub-system 3 includes at least three functional units: a first cryptographic unit 19 for decrypting EMMs, a second cryptographic unit 20 for decrypting ECMs and encrypting messages to the receiver 2, and a secure processor 21 for controlling the operation of the conditional access sub-system 3. Upon successful receipt and decryption of an EMM authorising decryption of a particular service, the secure processor 21 enables the second cryptographic unit 20 to derive control words from ECMs received through the interface 18. The control words are communicated to the descrambler 15 in messages passed through the interfaces 17,18. In the illustrated embodiment, the first cryptographic unit 19 also makes the second key of the public/private key pair available for use in setting up a secure and/or authenticated communications channel between the conditional access sub-system 3 and the descrambler 15.

Figure 2:
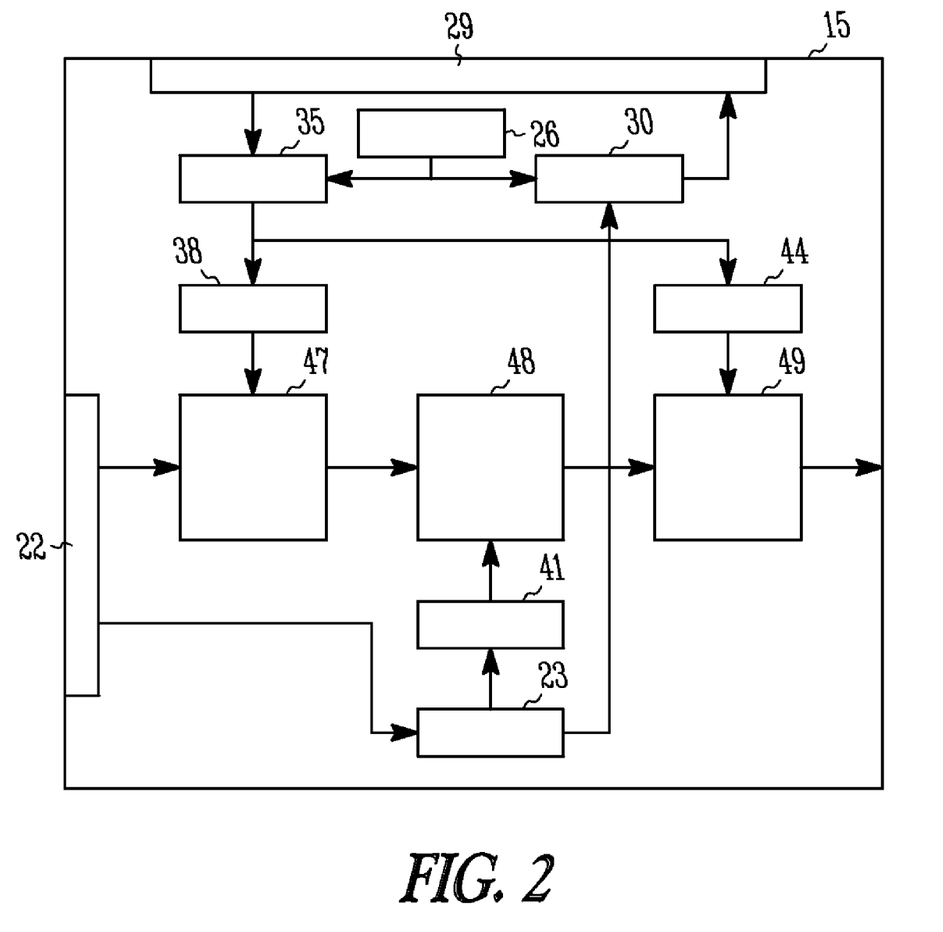
FIG. 2 is a very schematic diagram detailing functions provided in an implementation in hardware of a descrambler.
Figure 3:
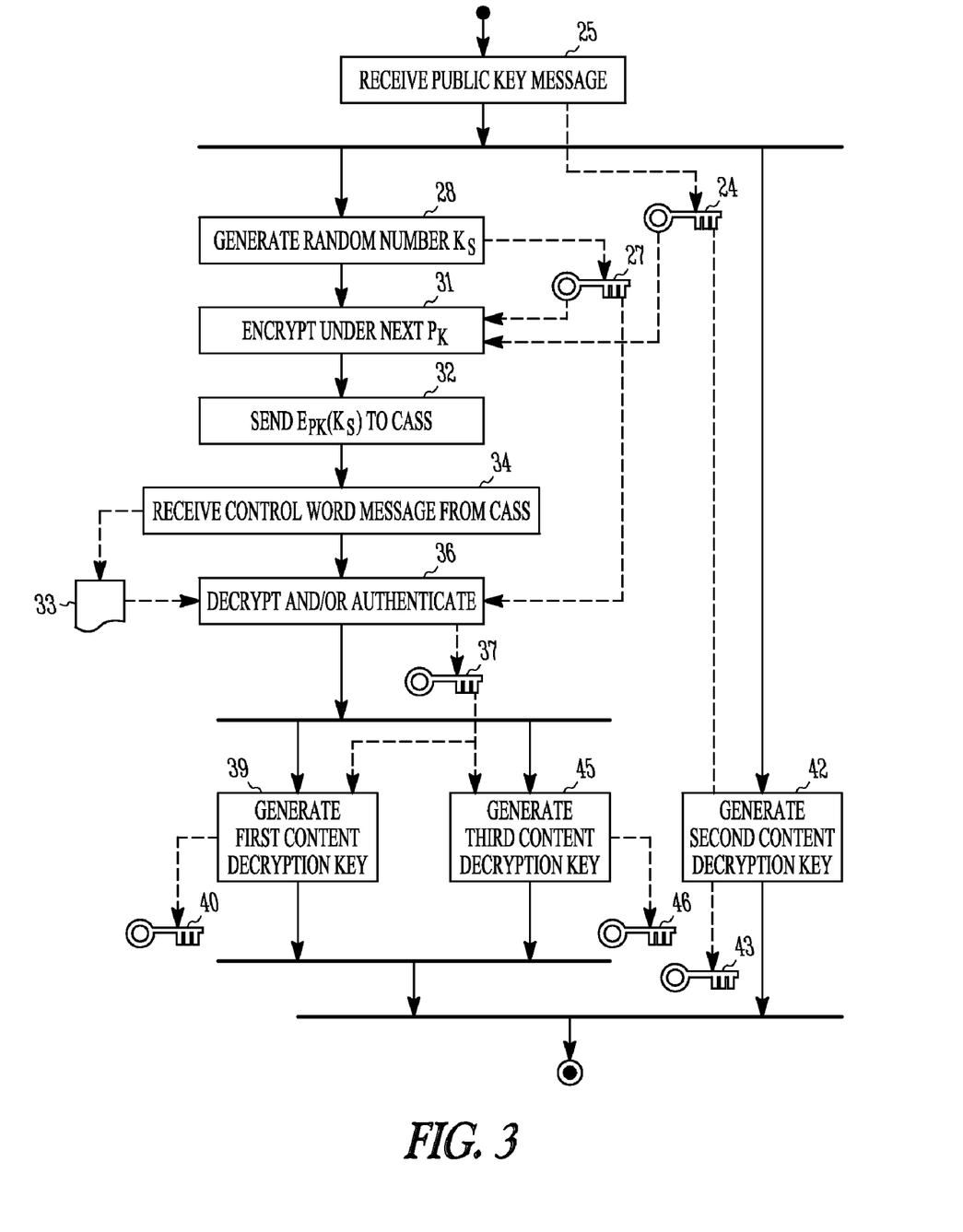
FIG. 3 is a flow chart illustrating a change of public key in the system illustrated in FIG. 1.

The operation of the descrambler 15 is illustrated by way of example in FIGS. 2 and 3. The descrambler 15 has a first interface 22 for receiving the scrambled content data stream to be descrambled and a unit 23 for retrieving a first key 24 of a public/private key pair in a key message from the head-end system (step 25 in FIG. 3). Receipt of a key message indicating a new first key is a trigger to have a random number generator 26 in the descrambler 15 generate a random number as a session key 27 in a next step 28. In the illustrated embodiment, the session key 27 is used to set up a secure communications channel to the conditional access sub-system 3 through a second interface 29. The session key 27 is used to decrypt cryptograms carried in messages received from the conditional access sub-system 3. These cryptograms include at least one of a digital signature and a cryptogram of one or more control words.

An encryption unit 30 encrypts (step 31) the session key 27 under the new first key 24 received in the first step 25. To this end, an asymmetric cipher under the first key 24 is applied to the session key 27. The session key 27 is established as the key for securing the communications channel to the conditional access sub-system 3 by communicating (step 32) a message including the encrypted session key 27 to the conditional access sub-system 3.

When the descrambler 15 receives a control word message 33 from the conditional access sub-system 3 (step 34), it is passed to a decryption unit 35, which uses the session key 27 to decrypt (step 36) at least one cryptogram carried in the control word message 33. In the illustrated embodiment, the decryption is carried out using a symmetric cipher under the session key 27. Encryption under the (random) session key 27 has the effect that it is not possible to "feed" the descrambler 15 with control word messages 33 obtained from a conditional access sub-system operating in conjunction with another authorised receiver 2.

It is noted that the first key 24 is used to authenticate the control word message 33 in the same step 36. In a known manner, the conditional access sub-system 3 uses the second key to sign the control word message 33, for example by encrypting a hash of at least part of the control word message 33 under the second key to form a cryptogram carried in the message. In another embodiment, the session key 27 is used to form the digital signature.

In those embodiments in which a digital signature is obtained from the control word message 33 and the first key 24 is used to verify the digital signature, the method stops (not illustrated in detail) if the result of the verification indicates that the signature is not correct. That is to say, that the descrambling of the scrambled content data stream is aborted. In a further variant of this embodiment in which a digital signature is verified, the contents of the control word message 33 are not encrypted by the conditional access sub-system 3. Only the signature, formed using the random number generated by the descrambler 15 or using the first key 24 as an encryption key for encryption of, for example, a hash of part or all of the contents of the control word message 33, is used to prevent substitution of the conditional access sub-system 3.

It is therefore noted that there may be two so-called "channel keys", namely the first key and the session key, depending on whether the communication between the descrambler 15 and conditional access sub-system 3 is secured, authenticated, or both. Each channel key is established using the first key. On the one hand, the key used for authentication is identical to the first key 24, so that it is established by its very retrieval in the first step 25. On the other hand, the session key 27 is established by an exchange of messages, of which at least one is encrypted under part or all of the first key 24.

As a result of carrying out the decryption and/or authentication step 36, the descrambler 15 obtains at least one control word 37 in the sequence generated by the CW generator 10.

A first function unit 38 applies a first function $f_a$ to the control word 37 to generate (step 39) a first content decryption key 40. A second function unit 41 applies a second function $f_b$ to the first key 24 to generate (step 42) a second content decryption key 43. A third function unit 44 applies a third function $f_c$ to the same control word 37 as used by the first function unit 38, in order to generate (step 45) a third content decryption key 46.

To descramble the scrambled content data stream, a first decryption unit 47 applies a first decryption cipher to the scrambled content data stream under the first content decryption key 40. The result of the application of the first decryption cipher is provided as input to a second decryption unit 48, which applied a decryption cipher under the second content decryption key 43. The result of the application of the second decryption cipher is provided as input to a third decryption unit 49, which applies a third decryption cipher under the third content decryption key 46.

In this manner a particular version of the first key 24 is required to descramble the scrambled content data stream. Even if it were possible to establish a session key 27 using a different public/private key pair than generated by the public/private key pair generator 12, then the descrambling by the descrambler 15 would fail, since the second decryption unit 48 would use a second content decryption key based on the wrong first key. Because the second content decryption key 43 is used in a cipher in between two ciphers using keys based on the control word 37, it is not possible to decrypt the scrambled content data stream under the correct first key outside the descrambler 15 and provide the descrambler 15 with control word messages 33 from another source. For this reason, the first key 24 need not be kept secret, nor even the second function $f_b$.

In an alternative embodiment (not illustrated in detail), a similar effect is achieved by using a single decryption unit that receives a key based on both the control word 37 and the first key 24. A function unit is advantageously employed to form the single key. As an example, the decryption unit could apply an AES cipher. An AES key of 128 bits could be obtained by concatenating 64 bits of key information from the control word 37 and 64 bits of key information from the first key 24. Alternatively, the function unit could implement a mixing function. In this alternative, the 128 bits are generated by having the control word 37 and the first key 24 undergo the mixing function. It is noted that the AES key in these embodiments is derivable partly from the first key 24 and partly from the control word 37.

Returning to the illustrated embodiment, the second function $f_b$ converts the first key 24 into a key for use in a symmetric cipher. In one embodiment, the second function $f_b$ is used to derive a key for an AES cipher from a public key for use in an RSA algorithm. This second function $f_b$ may be some sort of hash to reduce the key length from, for example, 1024 bits to a key length of 128 bits. Instead of an AES cipher, a special-purpose symmetric cipher can be implemented in the second decryption unit 48. As is known, keys used in asymmetric key ciphers are generally less random than those used in symmetric ciphers.

Figure 4:
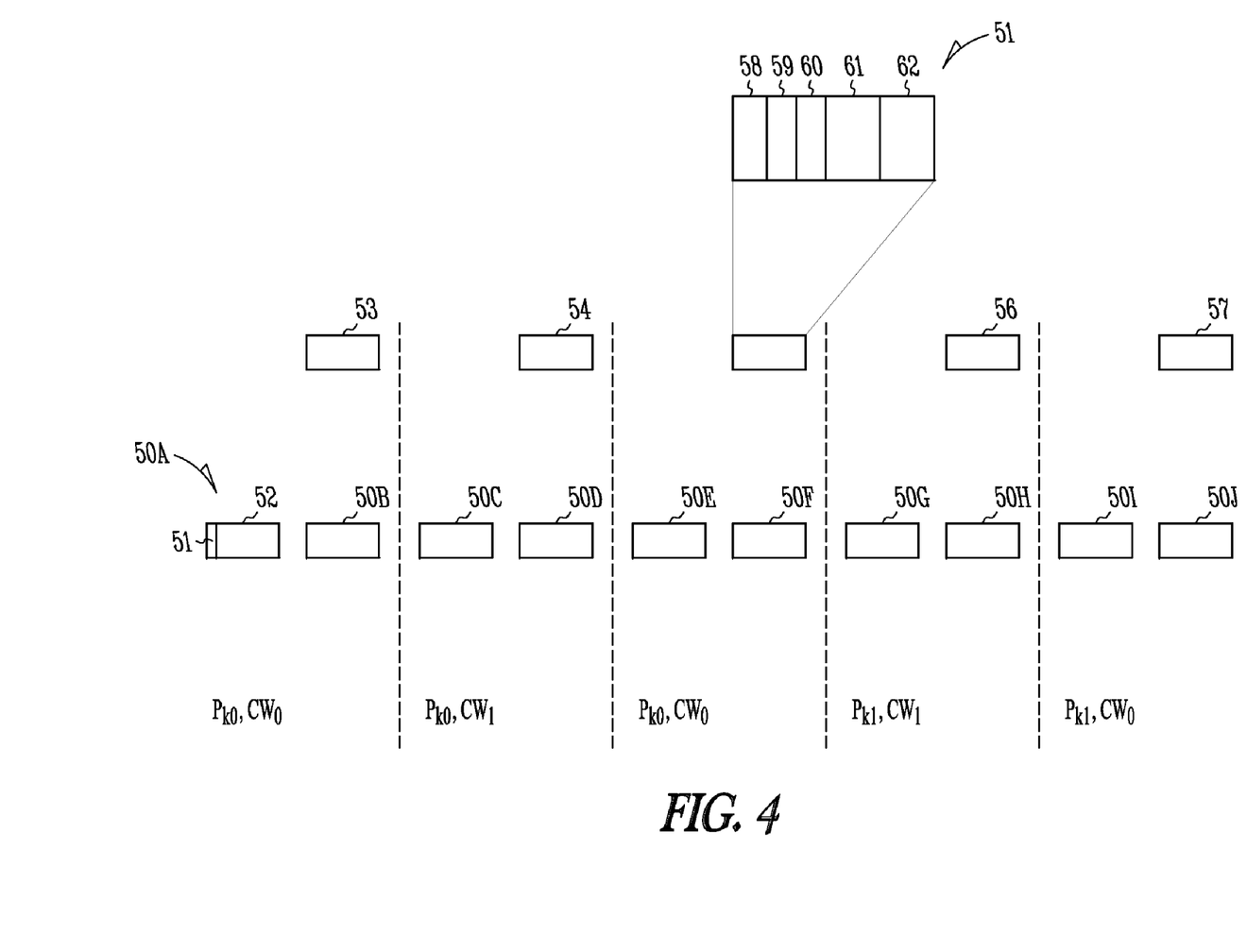
FIG. 4 is a schematic diagram illustrating key periods associated with a scrambled content data stream.

FIG. 4 illustrates how key changes are effected, using an MPEG-2 Transport Stream in accordance with international standard ISO/IEC 13818-1 as an example of a scrambled content data stream. Of course, the methods outlined herein are equally applicable to a stream of scrambled content data comprised of IP packets or RTP packets. Returning to the present example, each of a sequence of MPEG-2 TS packets 50a-50j comprises a header 51 and a payload 52. It is the payload 52 that is descrambled by the descrambler 15. The header 51 indicates that the payload 52 is encrypted, and which of an odd and even control word 37 is suitable for use in generating the first and third content decryption keys 40,46. In parallel, key messages 53-57 are continuously transmitted. The key messages 53-57 are synchronised with the scrambled content data stream by the head-end system 1.

In FIG. 4, five control word periods are shown. A next control word 37 in a sequence becomes valid with each transition to a next control word period. The period for which a first key 24 is valid is longer than the length of a control word period. In FIG. 4 a transition from a first first key $P_{k0}$ to a second first key $P_{k0}$ occurs after three control word periods. Within the first two control word periods, first and second key messages 53,54 are sent. Each contains information corresponding to the first first key $P_{k0}$, as well as data indicating that the next first key is also the first first key $P_{k0}$. A third key message 55 is sent within a control word period preceding a control word period of which the start coincides with the start of the use of a new first key. At least one copy of the third key message 55 is sent within the third control word period. The new first key is used to descramble those of the MPEG-2 TS packets 50 scrambled using the control word associated with the fourth control word period.

The third key message 55 includes a header 58, a field 59 referring to the current first key, i.e. the first first key $P_{k0}$, a field 60 referring to the next first key—this is the second first key $P_{k1}$ in this case—and it carries key information 61 corresponding to the first key currently in useable to descramble the scrambled content data stream, the first first key $P_{k0}$. The third key message 55 also carries information 62 corresponding to the first key valid within the next control word period, the second first key $P_{k1}$, since the field 60 referring to the next first key refers to a different key than the field 59 referring to the current first key. Fourth and fifth key messages 56,57 refer only to the second first key $P_{k1}$, because the first key does not change upon the next transition to a new control word. This manner of signaling the first key for the current and next control word period, if the latter differs from the current first key, in key messages 53-55 sent concurrently and in synchronisation with the actual MPEG-2 TS packets 50, which identify the current control word, has the effect that the data packets carrying the scrambled content data stream need not refer directly to the relevant first key 24 for descrambling the data packet payload. For clarity, FIG. 4 shows only one key message 53-57 for each of the five control word periods. In other embodiments, several copies of the key message applicable to a particular control word period are sent within that control word period. The effect is to allow the descrambler to commence operation earlier.

If the first, public, key 24 is changed, then the corresponding private key, the second key, in the conditional access sub-system 3 must also change. In embodiments where the conditional access sub-system 3 receives the second key in an encrypted message, it is advantageous to use an ECM. In this way, synchronisation between the start of the use of a next second key also coincides with the start of the use of a next control word, due to their being carried in encrypted form in the same message from the head-end system. Thus, transitions of both the first and the second key coincide with the transition from one control word to a next control word in a sequence. In another embodiment, EMMs are used to carry encrypted second keys. When the descrambler 15 performs the step 32 of sending an encrypted session key 27 to the conditional access sub-system 3, receipt of this message informs the conditional access sub-system 3 that it is to switch to a next second key previously received in an EMM. In an embodiment, the conditional access sub-system is configured to limit the rate at which new channel keys, i.e. session keys and/or second keys, are established to below or at a pre-determined level. This ensures that the conditional access sub-system 3 cannot be used with more than a pre-determined number of descramblers 15. In case the conditional access sub-system 3 is limited to use in conjunction with one descrambler and each message to the descrambler carries one control word, the fastest rate at which the conditional access sub-system is configured to accept messages establishing a new key for securing and/or authenticating information transferred via the communication channel to the descrambler will correspond to the rate at which transitions to the next control word occur.

Figure 5:
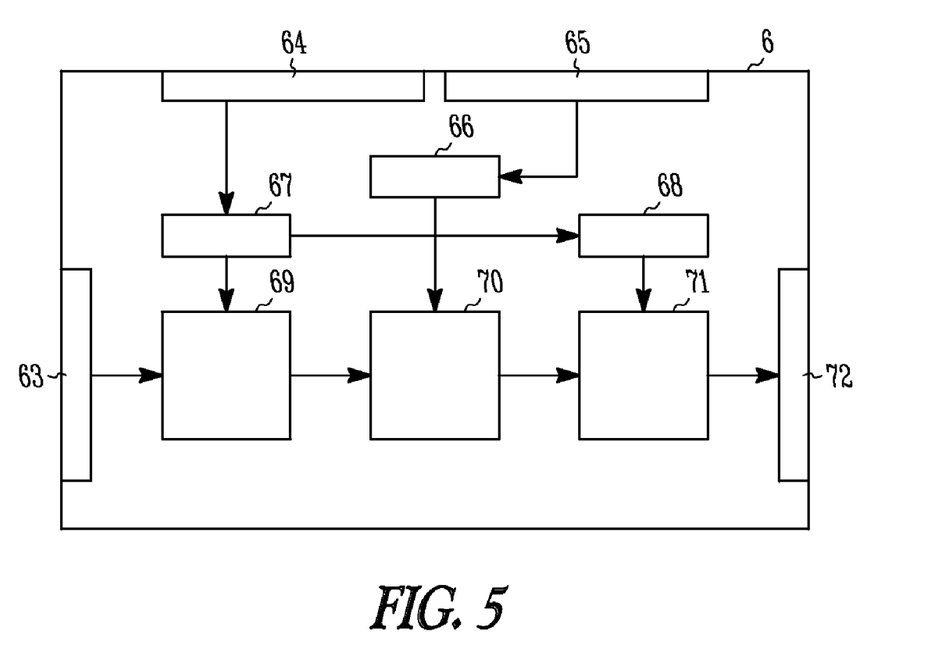
FIG. 5 is a very schematic diagram detailing functions provided in an implementation in hardware of a scrambler.

Functional blocks of an embodiment of the scrambler 6 implemented in hardware are shown in FIG. 5. An example of such an implementation is an application specific integrated circuit, or field programmable gate array. The descrambler includes in input interface 63 for receiving a clear content data stream, for example a succession of MPEG-2 TS packets, IP packets, RTP packets or Program Elementary Stream (PES) packets as defined in international standard ISO/IEC 13818-1. The scrambler 6 further includes an input interface 64 for receiving a sequence of control words from the CW generator 10. The descrambler 6 also includes an input interface 65 for receiving the first key 24 from the public/private key pair generator 12.

The first key 24 is a public key of an asymmetric key pair, but it is converted to a second content encryption key for use in a symmetric encryption algorithm, which conversion is carried out by a second function unit 66. This second function unit 66 corresponds to the second function unit 41 of the descrambler 15.

A current one of a sequence of control words received through the input interface 64 is provided to first and third function units 67,68. The first and third function units 67,68 correspond to the first and third function units 38,44 of the descrambler 15. They generate first and third content encryption keys, which are provided to first and third content encryption units 69,70. The second content encryption key, generated by the second function unit 66 is used in a symmetric key cipher, applied by a second content encryption unit 71. The scrambled content data stream provided as output by the third content encryption unit 70 is provided to an output interface 72.

The second content encryption unit 71 applies the encryption operation under a key at least derivable from a key forming a key pair with the key that is provided to the conditional access sub-system 3, as will be clear from the above description. The term "key pair" denotes a pair of keys of which one is useable to decrypt data encrypted under the other. In the case of a symmetric cipher, the two keys of a key pair are of course identical. The sequence of first, second and third content encryption units 69,71,70 forces the descrambler to use a corresponding sequence of decryption units 47-49, wherein an intermediate decryption unit uses a key derived from the first key 24. As mentioned, the effect is that the first key 24 need not necessarily be kept secret to enforce the use of a particular conditional access sub-system 3.

Where the receivers employ the alternative descrambler outlined above that uses a single decryption unit receiving a key based on both the control word 37 and the first key 24, the scrambler 6 will comprise a single, complementary encryption unit (not shown). A function unit is advantageously employed to form the single key used by the scrambler 6. The key used in this embodiment, which is preferably symmetric, is derived partly from the first key 24 and partly from the control word 37. Obviously, this derivation may take place either within the scrambler 6 or in an external unit.

The illustrated scrambler 6 is configured to ensure that a change in the first key 24 to a new value coincides with a change to a next one of a sequence of control words. In the case of clear content data stream comprised of a sequence of packets, a control word 37 of the sequence is used to derive the first and third content encryption keys for encrypting a certain number of packet payloads, before a transition to a next control word 37 of the sequence occurs, i.e. the start of a new control word period. A particular value of the first key 24 is used over a number of control word periods, before being replaced by a new value at a transition from one control word period to a next one.

The invention is not limited to the embodiments described above, but may be varied within the scope of the accompanying claims. For example, although the descrambler has been described as an integral component of the receiver 2, it, or a similar further descrambler, may also be comprised in a detachable module with an interface to the receiver 2. It may even be comprised on a smart card, together with the conditional access sub-system 3. Instead of using the key messages 53-57, a more complex signaling of the scrambling state may be used such as that described in ISMA, *ISMA Encryption and Authentication Specification* 1.0, February 2004, available from the Internet Streaming Media Alliance.

Although the description has focused on an implementation in a system for providing and obtaining conditional access to a scrambled broadcast or multicast content data stream, a system for digital rights management may similarly comprise the scrambler and descrambler described above in detail. The conditional access sub-system in such an embodiment is more commonly referred to as a DRM agent. In such an embodiment, the scrambled content data object comprises a data file. A scrambled content data file can be serialised into a scrambled content data stream, to which the techniques outlined above can be applied. It is noted that such an embodiment may make use of a single content descrambling key for the entire file, in effect using a single control word rather than a sequence of control words.

The invention claimed is:

1. A method of descrambling a scrambled content data object, comprising:
    establishing each channel key with a first key,
    obtaining at least one content descrambling key from a message received from a conditional access sub-system over a data communication channel,
    decrypting under an associated channel key at least one cryptogram of data obtainable from the at least one content descrambling key in the message with each of cryptogram being carried in the message,
    applying at least one decryption operation under a key at least partly derivable from the at least one content descrambling key to descramble at least a section of the scrambled content data object, and
    applying a decryption operation under a key at least partly derivable from the first key to descramble at least the section of the scrambled content data object,
    wherein the first key comprises a public key of an asymmetric key pair, and the method further comprises applying a cryptographic operation including an asymmetric cipher under the first key on data exchanged with the conditional access sub-system.

2. The method according to claim 1, wherein applying a decryption operation includes descrambling by applying a decryption operation under a key based on both the first key and the content descrambling key.

3. The method according to claim 1, applying a decryption operation includes descrambling by at least applying a first decryption operation on the section of the scrambled content data object under a key at least partly derivable from a content descrambling key and applying a further decryption operation under a key at least derivable from the first key to the output of the first decryption operation.

4. The method according to claim 1, applying a decryption operation includes descrambling by at least applying a second decryption operation under a key at least partly derivable from a content descrambling key to data obtained as output of a further decryption operation under a key at least derivable from the first key.

5. Method according to claim 3, further including deriving at least two keys from a single content descrambling key, using a first of the derived keys in the first decryption operation, and using a second of the derived keys in the second decryption operation.

6. The method according to claim 1, further including applying a decryption operation involving a symmetric key cipher under a key obtained as a function of at least the first key.

7. The method according to claim 1, further including
    generating a channel key,
    encrypting the generated channel key under the first key and communicating the encrypted channel key to the conditional access sub-system, and
    decrypting at least part of the message received from the conditional access sub-system under the channel key, preferably using a symmetric cipher.

8. The method according to claim 7, wherein generating a channel key includes establishing a new channel key upon receipt of a new version of the first key.

9. The method according to claim 1, further including:
    obtaining a digital signature from the message received from the conditional access sub-system,
    using at least the first key to verify the digital signature, and
    descrambling at least the section of the scrambled content data object dependent on the result of the verification.

10. The method according to claim 9, including:
    generating a channel key, preferably as a random number,
    encrypting the generated channel key under the first key and communicating the encrypted channel key to the conditional access sub-system, and
    further using the channel key to verify the digital signature.

11. A device for descrambling a scrambled content data object, including an input for receiving the scrambled content data object and an input for receiving messages from a conditional access sub-system over a data communication channel, wherein the device is configured to execute a method comprising:

establishing each channel key with a first key, obtaining at least one content descrambling key from a message received from the conditional access sub-system over the data communication channel, decrypting under an associated channel key at least one cryptogram of data obtainable from the at least one content descrambling key in the message with each of cryptogram being carried in the message, and applying a decryption operation under a key at least partly derivable from the first key to descramble at least the section of the scrambled content data object, wherein the first key comprises a public key of an asymmetric key pair, and the device is further configured to execute a method further comprising applying a cryptographic operation including an asymmetric cipher under the first key on data exchanged with the conditional access sub-system.

12. A method of providing conditional access to a content data object, including:

providing at least one content scrambling key to a scrambler, arranged to scramble at least a section of the data object by applying at least one encryption operation under a key at least partly derivable from the content scrambling key, providing an entitlement message to at least one conditional access sub-system for providing a message over a data communication channel to a descrambler of an authorised receiver, which message includes data enabling the descrambler to obtain at least one content descrambling key and which message to the descrambler carries at least one cryptogram, the conditional access sub-system being configured to generate the cryptogram by encrypting under a channel key data obtainable from at least one content descrambling key in the message, wherein the conditional access sub-system is configured to use a second key to establish the channel key, wherein the second key is a secret key of an asymmetric key pair, providing a first key corresponding to a public key of the asymmetric key pair to a transmitter arranged to communicate the first key in a message to the authorised receiver, and providing the conditional access sub-systems with key information representative of the second key and providing to the scrambler key information representative of the first key, wherein the scrambler is arranged to scramble at least the section of the content data object by applying an encryption operation under a key at least partly derivable from the first key.

13. The method according to claim 12, wherein the content data object comprises a content data stream, providing a sequence of control words to the scrambler, the scrambler being arranged to use a current one of the sequence of control words as the content scrambling key, further including transmitting the first key in an Entitlement Control Message that further includes at least one of the sequence of control words.

14. The method according to claim 12, including providing at least one portable secure device comprising a processing unit, memory, an interface to a descrambler of an authorised receiver and at least one of the conditional access sub-systems.

15. A system for providing conditional access to a content data object, comprising:

a scrambler arranged to scramble at least a section of the content data object by applying at least one encryption operation under a key at least partly derivable from a content scrambling key, at least one conditional access sub-system for providing a message over a data communication channel to a descrambler of an authorized receiver, which message includes data enabling the descrambler to obtain at least one content descrambling key and which message carries at least one cryptogram, wherein the conditional access sub-system is configured to generate the cryptogram by encrypting under a channel key data obtainable from at least one content descrambling key in the message to the descrambler, wherein the conditional access sub-system is configured to use a second key to establish the channel key, wherein the second key is a secret key of an asymmetric key pair, wherein the system is configured to provide a first key corresponding to a public key of the asymmetric key pair to a transmitter arranged to communicate the first key in a message to the authorised receiver, wherein the scrambler is arranged to scramble at least the section of the content data object by applying an encryption operation under a key at least partly derivable from the first key.

16. The system according to claim 15, wherein the scrambler is configured for scrambling a content data object comprising a content data stream, wherein the system is arranged to effect a change in value of the second key, wherein the system further comprises a system to synchronize a change in supply of the second key to a new value with a transition from use of a current one to use of a next one of a sequence of control words as content scrambling key.

17. The system according to claim 15, wherein the scrambler is configured to scramble at least the section of the content data object by at least applying a first encryption operation on the section of the content data object under a key at least partly derivable from a content scrambling key and applying a further encryption operation under a key at least partly derivable from a first key forming a key pair with the second key to the output of the first encryption operation.

18. The system according to claim 15, wherein the scrambler is configured to scramble at least the section of the content data object by at least applying a second encryption operation under a key at least partly derivable from a content scrambling key to data obtained as output of a further encryption operation under a key at least partly derivable from a first key forming a key pair with the second key.

19. The system according to claim 17, configured to derive at least two keys from a single content scrambling key, and to use a first of the derived keys in the first encryption operation and a second of the derived keys in the second encryption operation.

20. The system according to claim 15, wherein the encryption operation under a key at least partly derivable from the first key involves a symmetric key cipher under a key obtained as a function of at least the first key.

21. A device for scrambling a content data object, comprising: a scrambler arranged to scramble at least a section of the content data object by applying at least one encryption operation under a key at least partly derivable from a content scrambling key, and the scrambler is arranged to scramble at least the section of the content data object by applying an encryption operation under a key at least partly derivable from a first key forming a key pair with a second key, wherein the first key comprises a public key of an asymmetric key pair and the second key comprises a secret key of the asymmetric key pair.

22. A computer-readable non-transitory storage medium containing a set of instructions that, when executed by a processor, perform a method comprising:

establishing each channel key with a first key, obtaining at least one content descrambling key from a message received from a conditional access sub-system over a data communication channel, decrypting under an associated channel key at least one cryptogram of data obtainable from the at least one content descrambling key in the message with each of cryptogram being carried in the message, applying at least one decryption operation under a key at least partly derivable from the at least one content descrambling key to descramble at least a section of the scrambled content data object, and applying a decryption operation under a key at least partly derivable from the first key to descramble at least the section of the scrambled content data object, wherein the first key comprises a public key of an asymmetric key pair, and the device is further configured to execute a method further comprising applying a cryptographic operation including an asymmetric cipher under the first key on data exchanged with the conditional access sub-system.

* * * * *